United States Patent

[11] 3,627,587

| [72] | Inventors | Hans-Georg Lindenberg<br>Hannover;<br>Ulrich Hintz, Frielingen, both of Germany |
|---|---|---|
| [21] | Appl. No. | 40,813 |
| [22] | Filed | May 27, 1970 |
| [45] | Patented | Dec. 14, 1971 |
| [73] | Assignee | Varta Aktiengesellschaft<br>Frankfurt am Main, Germany |
| [32] | Priority | June 3, 1969 |
| [33] | | Germany |
| [31] | | P 19 28 288.3 |

[54] STORAGE BATTERY AND METHOD OF MAKING THE SAME
15 Claims, 3 Drawing Figs.

[52] U.S. Cl. .................................................. 136/166,
136/170, 136/176
[51] Int. Cl. .................................................. H01m 1/02
[50] Field of Search ........................................... 136/166,
170, 176; 156/69

[56] References Cited
UNITED STATES PATENTS
3,416,969 12/1968 Halsall ........................ 136/166
3,528,542 9/1970 Miller ........................ 136/176

*Primary Examiner*—Donald L. Walton
*Attorney*—Michael S. Striker

ABSTRACT: A storage battery has a casing composed of a bottom portion and a cover therefor. Both are hollow and have normally juxtaposed open sides with edge faces of the peripheral walls bounding the respective open sides. Both the cover and the bottom portion of the casing are subdivided by at least one partition wall a free edge of which is located in the plane of the respective edge face. One or both of these free edges is provided with a reinforcing bead wider than the respective partition wall and extending along parts or the entire free edge. The free edge of the partition wall in the bottom case portion is provided with a downwardly extending cutout in which a conductive bridge member is received with clearance which extends into the respective chambers to connect electrode assemblies located therein. This clearance is completely filled with a hardenable synthetic plastic material and at the same time the reinforcing bead is formed of the same material on the respective upper free edge, in accordance with the present method.

3,627,587

STORAGE BATTERY AND METHOD OF MAKING THE SAME

CROSS-REFERENCES TO RELATED APPLICATIONS

A related application, Ser. No. 868,035 was filed on Oct. 21, 1969 in the name of Hans-Georg Lindenberg and is copending under the title "METHOD OF MANUFACTURING A STORAGE BATTERY."

BACKGROUND OF THE INVENTION

The present invention relates generally to storage batteries and more particularly to a method of assembling a storage battery and to a novel battery housing.

Storage batteries of the type utilizing more than one electrode assembly generally comprise two housing sections, that is a main housing section accommodating the electrode assemblies, and a cover section. The interior of the two sections is subdivided into a requisite number of chambers each of which accommodates an electrode assembly. The subdivision is afforded by a requisite number of partition walls whose free edges—at the respective open side of the section in question—are located at least substantially in the plane of the edge face provided on the respective circumferential wall and bounding the respective open side. Such housings are made usually of synthetic plastic materials, such as polypropylene, polyethylene or polystyrol or else of fiber-reinforced synthetic plastic materials. Evidently, the two housing sections must be fluidtightly connected with one another when the battery is assembled, and in particular the individual chambers into which the interior of the housing sections is subdivided, must be completely fluidtight with reference to one another.

This realization is of course not new and a number of approaches is known from the art to afford the requisite sealing. For instance, it is known to provide the edge faces on the two housing sections, which edge faces will abut one another when the housing sections are placed in a position where they are intended to completely close the battery, and may be provided with interengaging tongue and groove formations. These are then contacted with a hardenable material before they are placed into engagement, and subsequent to being placed in such engagement they are maintained in engaged position until the material has hardened and connects them together. However, this approach has the significant disadvantage that a relatively substantial period of time must pass before the material is hardened because the evaporation of solvents for the polymerization of the bonding material proceeds only relatively slowly at normal room temperature. Attempts to use ordinary adhesives for effecting the connection have also been found extremely difficult if not at all possible, because to such synthetic plastics as polypropylene and the like the adhesives will not properly adhere.

A different approach suggested in the prior art was to form the edge face of the peripheral wall on the cover portion with a continuous groove, and to similarly form the free edge of the partition wall in the cover portion with such a groove. Placing this edge face on the edge face of the main housing portion, there will then be a free space which is defined by the groove in form of channel and into which it has been proposed to inject flowable binder material. Still another approach is to connect the cover and housing portions by means of high-frequency welding. Here, auxiliary means is introduced between the surfaces which are to be welded together so that the heat-energy of the high-frequency field becomes in effect focused in the welding zone in which the auxiliary means is located to thereby effect welding-together of the abutting edge faces of the cover and housing portion. However, it has been found that this requires rather complicated and expensive apparatus and thus is not economical.

An approach which has been found generally satisfactory, and which is widely used in the industry, is the so-called "reflective welding" method in which a heating plate is positioned between the juxtaposed edge faces and edges which are to be connected with one another, in parallelism with them and at identical distances from them, and as a result of radiation and convention the material of the cover and main housing portions in the region of the edge faces and free edges is heated to softening point. Thereupon the heating plate is withdrawn and the surfaces and free edges are brought into abutment with a seal being established as soon as the material again solidifies. While it has just been said that this is by far the most satisfactory approach to date to this problem, the statement should not be taken to mean that there are no difficulties involved in this method. Specifically, the thickness of partition walls in modern batteries, especially those of polypropylene, is very small and may for instance be on the order to 1.5 to 2.5 mm. On insertion of the electrode assemblies into the respective chambers it can therefore occur that the separating wall or walls become deformed. The same can occur when the surfaces to be sealingly connected are subjected to heating preparatory to such connection. In either case it will be evident, when under such circumstances the cover is placed onto the main casing portion, the free edges of the respectively associated partition walls in the main casing portion and in the cover will then be laterally offset with reference to one another and will not move into mating and sealing abutment. The result is a leak which establishes communication between two adjacent battery chambers, a condition which must be avoided under all circumstances.

SUMMARY OF THE INVENTION

It is, accordingly, an object of the present invention to avoid the aforementioned disadvantages.

More particularly it is an object of the present invention to provide an improved method of assembling a battery of the type under discussion, a method which will avoid these disadvantages.

An additional object of the invention is to provide a novel battery housing or casing of the type under discussion.

In pursuance of the above objects, and others which will become apparent hereafter, one feature of the invention resides in a method of making a battery which, briefly stated, comprises the steps of making a battery case having at least one partition wall subdividing the interior of the case into two adjacent chambers and being provided with an upper elongated edge formed with a cutout. An electrode assembly is inserted into each of these chambers and the assemblies are electrcially connected via a conductive bridge member which in part extends with clearance through the cutout. Thereupon a hardenable synthetic plastic material is introduced into this clearance so as to completely fill the same, and simultaneously a reinforcing bead of the plastic material is formed on at least a portion of the upper edge of the partition wall.

This method has already been described in the aforementioned copending application, except for the formation of the reinforcing bead or beads. Absent such reinforcing bead or beads, however, the method according to the aforementioned copending application can not achieve the purposes of the present invention, namely to overcome the earlier-identified disadvantages of the prior art. Of course, the method according to the copending application achieves its own objects which are, however, different from those of the present invention.

It is conceivable to form the bead or beads when the battery case, of which the partition wall is a unitary component, is made rather than to form it at the time the aforementioned clearance is filled with the hardenable synthetic plastic material. However, this would require a very complicated mold construction in order to permit not only the formation of the bead or beads in the requisite location, but also the subsequent removal of the finished—usually injection molded—casing from the mold. Evidently this would be quite expensive but it is nevertheless pointed out that even under those circumstances the advantages afforded by the present invention would economically justify the increased expense. However, the necessity for such additional expenses is avoided in a very simple manner by resorting to the above-described method where the reinforcing bead or beads will be formed in requisite location at the same time as the clearance around that portion of the bridge member which is accommodated in the cutout is filled with hardenable synthetic plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
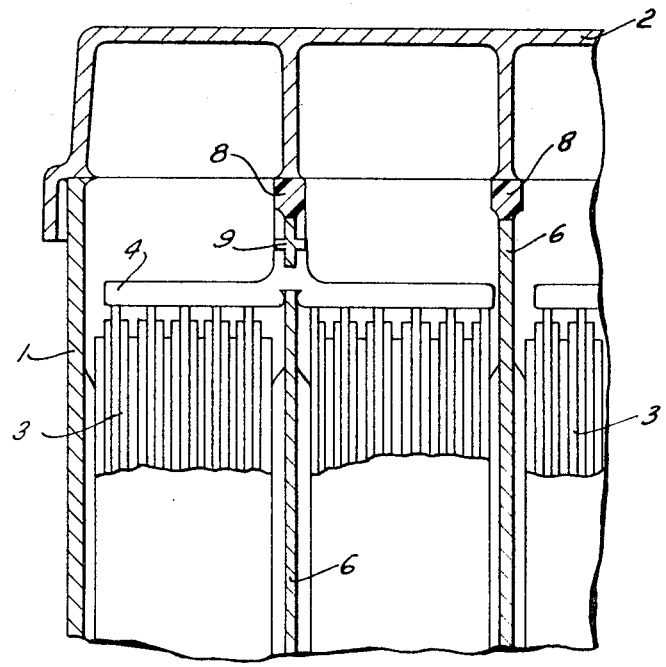
FIG. 1 is a fragmentary, side-elevational sectional view of a battery assembled in accordance with the present invention.
Figure 2:
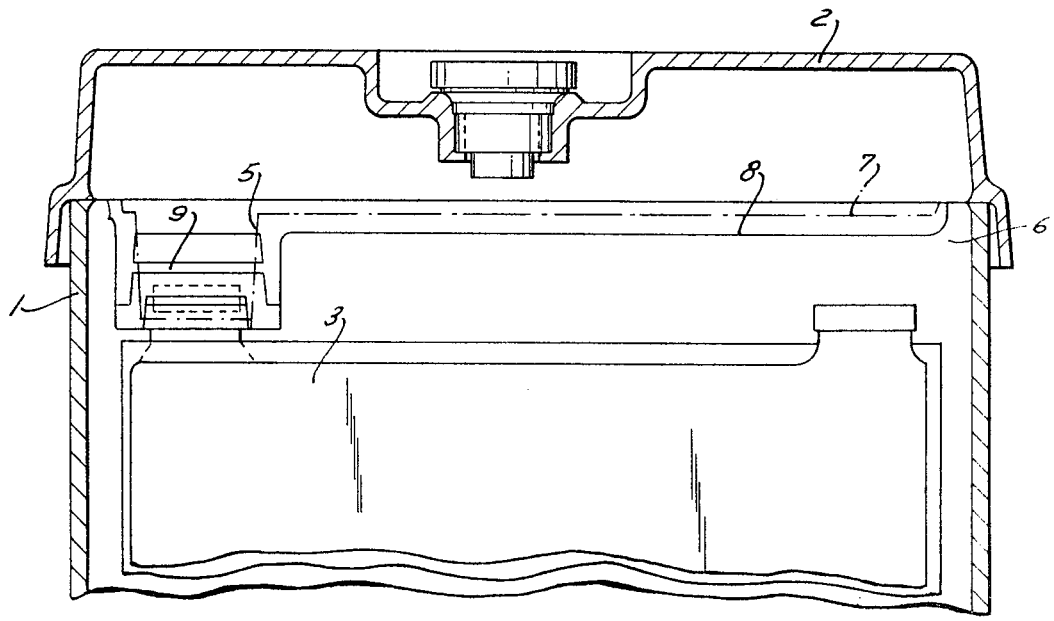
FIG. 2 is a transverse section through the embodiment in FIG. 1.

Discussing firstly FIGS. 1 and 2 it will be seen that reference numeral 1 identifies the bottom or main housing or casing portion of a battery according to the present invention. Reference numeral 2 identifies the top or cover portion therefor. In conventional manner the respective open sides of the portions 1 and 2 face one another. The interior of the portions 1 and 2 is subdivided into a desired number of chambers by a requisite number of partition walls 6 (two shown in FIG. 1) which are usually of one piece with the respective section 1 or 2. In the thus-created chambers there are accommodated electrode assemblies 3 of known construction which therefore need no further discussion. The assemblies 3 in adjacent ones of these chambers are connected, also in known manner, by electrically conductive bridging members 4. For details of this connection, which is conventional, reference may be had to the aforementioned copending application Ser. No. 868,035.

The upper free edge of the partition walls 6 in the casing section 1 is provided with a cutout 5 (see FIG. 2). A thicker portion of the respective bridging members 4 is located with clearance in this cutout 5 whereas the remainder of the respective bridging members extends into the respectively adjacent chambers which are thus placed in communication via the cutout 5. The preferred contour of the upper free edge of the partition walls 6, that is the contour of the free edge which it will preferably—but not necessarily—have before the electrode assemblies 3 are inserted into the associated chambers, is identified by the chain line 7 in FIG. 2.

Once the electrode assemblies 3 and bridging members 4 are in place, hardenable synthetic plastic material is introduced by means of a conventional injection-molding process into the clearance defined within the cutout 5 by the thickened portion of the bridging member 4. The synthetic plastic material completely fills this clearance and thus seals the adjacent chambers against communication with one another via the clearance. This has already been disclosed in the aforementioned copending application.

According to the present invention, however, we provide the reinforcing bead 8 at the upper free edge of the partition wall or walls 6 at the same time as the synthetic plastic material is introduced by injection-molding process into the aforementioned clearance. Of course, at this time the cover 2 is not in the position illustrated in FIGS. 1 and 2, but instead is not yet connected with the housing section 1. It thus does not interfere with the injection molding process.

The reinforcing bead 8 illustrated in the drawing may extend along the entire upper free edge of the respective partition wall 6, or it may extend along only one or more portions thereof. Of course, the most advantageous embodiment is to have the bead 8 extend over the entire length of the upper free edge, and to have it closely approach the free edge face of the housing or casing section 1 bounding the open side of the latter. In the region of the cutout 5 the reinforcing bead 8 can extend all the way to the bridging member 4, or else it can terminate short of the cutout 5 and a separate bead portion 9 can be molded over that portion of the bridging member 4 which is located in the cutout 5 (see particularly FIG. 1).

According to the invention the cross-sectional configuration of the reinforcing bead 8 should advantageously be polygonal, preferably substantially rectangular, and its upper free surface—which should be located in the same general plane as the peripheral edge face of the casing portion 1 bounding the open side of the latter—should have a width of between approximately 3 and 5 mm. preferably of approximately 4 mm. when the thickness of the partition wall 6 itself is approximately between 1.5 and 2.5 mm. The height of the bead 8 should also be on the order of approximately 4—5 mm. It is specifically emphasized that the cross-sectional configuration of the bead 8 may be other than rectangular, for instance its lateral or side faces may gradually taper downwardly until they merge with the side faces of the associated partition wall 6.

As already pointed out, it is not absolutely necessary to provide the partition walls 6 with the reinforcing bead or beads only at the time hardenable synthetic plastic material is injected into the clearance left by that portion of the bridging member 4 which is accommodated in the cutout 5. It is possible to produce the battery housing or casing with these reinforcing beads 8 being formed at the time the remainder of the housing or casing is molded.

Figure 3:
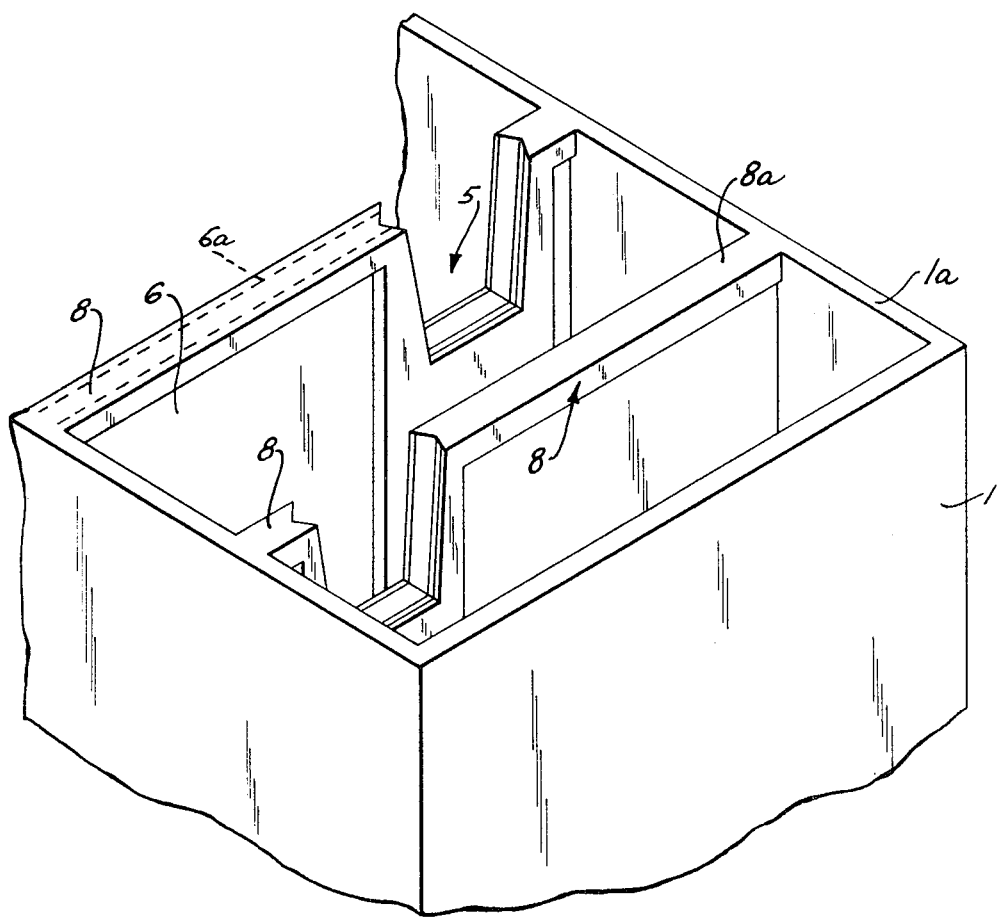
FIG. 3 is a fragmentary perspective view of the bottom or main casing or housing portion of a novel battery housing according to the present invention.

In FIG. 3 we have shown by way of example a portion of the main housing or casing portion 1 of such a battery casing, the cover having been omitted for the sake of clarity and as being readily understood without illustration. Like reference numerals in FIG. 3 identify the same components as in FIGS. 1 and 2. The difference of FIG. 3 over FIGS. 1 and 2 is simply that in accordance with conventional injection-molding techniques the casing portion 1 has been produced by injection molding and at the same time the reinforcing bead or beads 8 have been formed. When the casing is made in this manner—and of course the cover for it will then be similarly made—the injection of synthetic plastic material subsequent to installation of the bridging members 4 (see FIGS. 1 and 2) is then confined only to filling the clearance remaining in the cutout 5, in the manner described in the copending application Ser. No. 868,035.

In FIG. 3 we have illustrated in chain lines and designated with reference numeral 6a the thickness of the partition walls 6, to contrast this with the thickness of the beads 8. Reference numeral 1a identifies the circumferential edge face of the casing portion 1 bounding the open side of the latter, and reference numeral 8a identifies the upper free edge of the partition wall 6 which is of course also the upper surface of the reinforcing beads 8, and which is, as shown in FIG. 3, located in the same general plane as the edge faces 1a.

It remains to be pointed out that regardless of whether one resorts to the method described herein with reference to FIGS. 1 and 2, or whether one produces the battery housing or casing which is in part illustrated in FIG. 3, it is possible to have the reinforcing beads 8 extend all along the respective upper edges of the partition walls 6, to have them extend along only portions of these upper edges, to provide them only on the partition walls 6 in the casing portion 1, to provide them only on the partition walls of the cover portion 2 (see FIGS. 1 and 2) or to provide them on the partition walls 6 both of the portions 1 and 2. It is, however, generally sufficient, and therefore most economical and advantageous to provide the reinforcing beads 8 only on the partition walls 6 of the main housing or casing portion 1.

It will be understood, that each of the elements described above, or two or more together, may also find a useful application in other types of constructions differing from the types described above.

While the invention has been illustrated and described as embodied in a battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of making a battery, comprising the steps of making a battery case having at least one partition wall subdividing the interior of said case into two adjacent chambers and provided with an upper elongated edge formed with a cutout; inserting an electrode assembly into each of said chambers; electrically connecting said assemblies via a conductive bridge member which in part extends with clearance through said cutout; and introducing a hardenable synthetic plastic material into said clearance so as to completely fill the same, while simultaneously forming a reinforcing bead of said plastic material on at least a portion of said upper edge of said partition wall.

2. A method as defined in claim 1, said battery case having sidewalls from which said partition wall extends inwardly, and wherein the step of forming said bead comprises forming a continuous bead extending from the immediate proximity of said sidewalls along said upper edge.

3. A method as defined in claim 1, comprising forming said bead with a polygonal cross section.

4. A method as defined in claim 1, comprising forming said bead with a substantially rectangular cross section.

5. A method as defined in claim 1, comprising forming said bead with an edge face facing upwardly away from said upper edge, and with two side faces which taper downwardly away from said edge face into said partition wall.

6. A method as defined in claim 1, comprising forming said bead with a width of between substantially 3 and 5 mm. in direction transverse to the elongation of said upper edge.

7. A method as defined in claim 1, comprising forming said bead with a width of substantially 4 mm. in direction transverse to the elongation of said upper edge.

8. A battery housing, comprising a pair of hollow housing sections having respectively normally juxtaposed open sides and each being provided with a peripheral wall having an edge face which bounds the respective open side; at least a pair of partition walls of predetermined thickness each subdividing the interior of the respective housing section in two chambers and having a free edge located at least substantially in the general plane of the respective edge face; and reinforcing bead means provided on and extending along at least a portion of at least one of said free edges, and having a width greater than said predetermined thickness.

9. A battery housing as defined in claim 8, wherein said width corresponds to substantially double said predetermined thickness.

10. A battery housing as defined in claim 8, one of said sections constituting the battery case and the other section constituting a cover therefor; and wherein said one free edge is the free edge on said partition wall in said one section.

11. A battery housing as defined in claim 8, one of said sections constituting the battery case and the other section constituting a cover therefor; and wherein said one free edge is the free edge on said partition wall in said other section.

12. A battery housing as defined in claim 8, one of said sections constituting the battery case and the other of said sections constituting a cover therefor; and wherein said bead means comprises two reinforcing beads each provided on and extending along at least a portion of the respective free edges.

13. A battery as defined in claim 8, said free edges each having a predetermined length, and wherein said reinforcing bead means extends along the entire length of said one free edge.

14. A battery as defined in claim 8, said reinforcing bead means being of polygonal cross section.

15. A battery as defined in claim 8, said reinforcing bead means being of substantially rectangular cross section.

* * * * *